US012756300B2

(12) United States Patent
Huang et al.

(10) Patent No.: US 12,756,300 B2
(45) Date of Patent: Oct. 6, 2026

(54) POWER SUPPLY DEVICE AND POWER SUPPLY UNIT

(71) Applicant: GIGA-BYTE TECHNOLOGY CO., LTD., New Taipei City (TW)

(72) Inventors: Shun-Chih Huang, New Taipei City (TW); Tai-Chuan Mao, New Taipei City (TW); Chih-Lung Chang, New Taipei City (TW); Li-Kai Lin, New Taipei City (TW); Wei-En Shih, New Taipei City (TW)

(73) Assignee: GIGA-BYTE TECHNOLOGY CO., LTD., New Taipei City (TW)

( * ) Notice: Subject to any disclaimer, the term of this patent is extended or adjusted under 35 U.S.C. 154(b) by 202 days.

(21) Appl. No.: 18/747,474

(22) Filed: Jun. 19, 2024

(65) Prior Publication Data

US 2024/0396440 A1 Nov. 28, 2024

(30) Foreign Application Priority Data

May 25, 2023 (TW) ................................ 112119444

(51) Int. Cl.
*H02M 3/00* (2006.01)
*H02M 3/335* (2006.01)

(52) U.S. Cl.
CPC ........... *H02M 3/003* (2021.05); *H02M 3/335* (2013.01)

(58) Field of Classification Search
CPC .............................. H02M 3/003; H02M 3/335
USPC .......................................................... 361/748
See application file for complete search history.

(56) References Cited

U.S. PATENT DOCUMENTS

| | | | | |
|---|---|---|---|---|
| 8,724,337 B2 * | 5/2014 | Teng | H05K 7/1492 361/810 |
| 2017/0094782 A1 * | 3/2017 | Park | H05K 1/0272 |
| 2020/0020603 A1 * | 1/2020 | Tsao | H10W 42/121 |
| 2022/0263421 A1 | 8/2022 | Yu et al. | |
| 2022/0264759 A1 | 8/2022 | Sawyer et al. | |

FOREIGN PATENT DOCUMENTS

| | | |
|---|---|---|
| CN | 214101195 | 8/2021 |
| CN | 214101195 U * | 8/2021 |
| CN | 215897605 | 2/2022 |
| CN | 219041650 | 5/2023 |
| CN | 219041650 U * | 5/2023 |
| TW | M455192 | 6/2013 |

(Continued)

OTHER PUBLICATIONS

"Search Report of Europe Counterpart Application", issued on Jan. 8, 2025, p. 1-p. 9.

*Primary Examiner* — Andargie M Aychillhum
(74) *Attorney, Agent, or Firm* — JCIPRNET

(57) ABSTRACT

A power supply device and a power supply unit are provided. The power supply device includes a main circuit board, a power output panel, and a power supply unit. The power output panel is arranged on the main circuit board. The power supply unit is arranged on the main circuit board. The power supply unit provides an output power source. The power supply unit includes an output connection electrode. The output connection electrode is electrically connected to the power output panel. The output connection electrode transmits the output power source from the power supply unit to at least one connector of the power output panel.

16 Claims, 9 Drawing Sheets

(56) References Cited

FOREIGN PATENT DOCUMENTS

| | | |
|---|---|---|
| TW | I450287 | 8/2014 |
| TW | 202230894 | 8/2022 |
| TW | 202246943 | 12/2022 |

* cited by examiner

POWER SUPPLY DEVICE AND POWER SUPPLY UNIT

CROSS-REFERENCE TO RELATED APPLICATION

This application claims the priority benefit of Taiwan application serial no. 112119444, filed on May 25, 2023. The entirety of the above-mentioned patent application is hereby incorporated by reference herein and made a part of specification.

BACKGROUND

Technical Field

The disclosure relates to a power supply device and a power supply unit, and in particular, to a power supply device and a power supply unit capable of reducing output impedance.

Description of Related Art

In a conventional power supply device, a power supply unit is generally disposed on a circuit board. The power supply unit includes the transformer and the secondary circuit. The transformer's secondary winding provides the converted power to the circuit board. The secondary circuit arranged on the circuit board generates the output power source according to the converted power source. The power supply unit provides the output power source to a power output panel having at least one connector through the circuit board.

However, in order to improve the efficiency of the power supply device, the design of the existing power supply devices and the power supply units needs to be adjusted.

SUMMARY

The disclosure provides a power supply device and a power supply unit capable of reducing output impedance.

The disclosure provides a power supply device including a main circuit board, a power output panel, and a power supply unit. The power output panel is arranged on the main circuit board. The power supply unit is arranged on the main circuit board. The power supply unit provides an output power source. The power supply unit includes an output connection electrode. The output connection electrode is electrically connected to the power output panel. The output connection electrode transmits the output power source from the power supply unit to at least one connector of the power output panel.

The disclosure further provides a power supply unit configured to provide an output power source to a power output panel. The power supply unit includes a transformer and an output connection electrode. The output connection electrode is electrically connected between transformer and the power output panel. The output connection electrode transmits the output power source to at least one connector of the power output panel.

To sum up, the output connection electrode transmits the output power source to at least one connector of the power output panel. The output power source is transmitted to the power output panel through the output connection electrode. The power output path of the output power source does not pass through the main circuit board. In this way, the output impedance of the power supply device is reduced. The efficiency of the power supply device is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
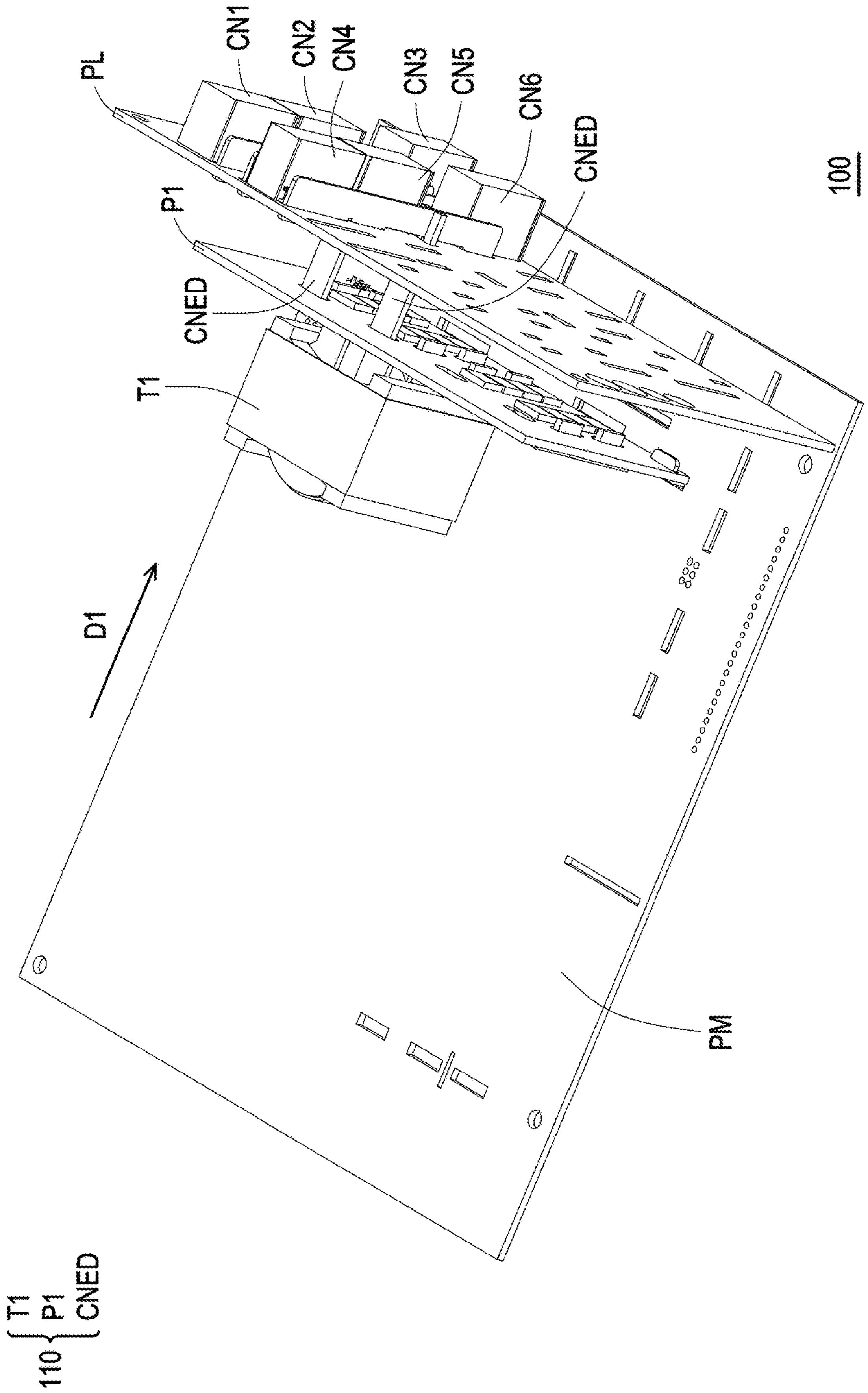
FIG. 1 is a schematic view of a power supply device according to a first embodiment of the disclosure.

Several embodiments of the disclosure are described in detail below accompanying with figures. In terms of the reference numerals used in the following descriptions, the same reference numerals in different figures should be considered as the same or the like elements. The embodiments are only a portion of the disclosure, which do not present all embodiments of the disclosure. More specifically, these embodiments are only examples in the scope of the patent application of the disclosure.

With reference to FIG. 1, FIG. 1 is a schematic view of a power supply device according to a first embodiment of the disclosure. In this embodiment, a power supply device 100 includes a main circuit board PM, a power output panel PL, and a power supply unit 110. The main circuit board PM may be a carrier board of the power supply device 100. The main circuit board PM is, for example, a printed circuit board (PCB). The power output panel PL is arranged on the main circuit board PM. The power output panel PL at least includes connectors CN1 to CN6. The connectors CN1 to CN6 are used to output power sources to different devices, elements, or other circuit boards outside the power supply device 100.

In this embodiment, the power supply unit 110 is arranged on the main circuit board PM. In other words, the main circuit board PM carries the power output panel PL and the power supply unit 110. The power supply unit 110 provides an output power source. The power supply unit 110 includes an output connection electrode CNED. The output connection electrode CNED is electrically connected to the power output panel PL. The output connection electrode CNED transmits the output power source from the power supply unit 110 to the connectors CN1 to CN6 of the power output panel PL. In this embodiment, the output connection electrode CNED is a metal pin. In this embodiment, the power supply unit 110 is exemplified by two output connection electrodes CNED, but the number of output connection electrodes of the disclosure is not limited to this embodiment. The number of the output connection electrodes of the disclosure can be one or more.

It is worth mentioning herein that the output connection electrodes CNED transmit the output power source to the connectors CN1 to CN6 of the power output panel PL. The output power source is transmitted to the power output panel PL through the output connection electrodes CNED. Since a power output path of the output power source does not pass through the main circuit board PM, the power output path is shortened by approximately 50%. In this way, output impedance of the power supply device 100 can be reduced by approximately 50%. Efficiency of the power supply device 100 can be improved. After testing, the efficiency of the power supply device 100 can be improved by 1% to 2%.

In this embodiment, the power supply unit 110 further includes a transformer T1 and a circuit board P1. The output connection electrodes CNED are electrically connected between the transformer T1 and the power output panel PL. The circuit board P1 is used to support at least a portion of a secondary circuit of the power supply unit 110. The circuit board P1 is electrically connected to the output connection electrodes CNED.

In this embodiment, the output connection electrodes CNED extend from the transformer T1 to the power output panel PL in a same direction D1.

Figure 2:
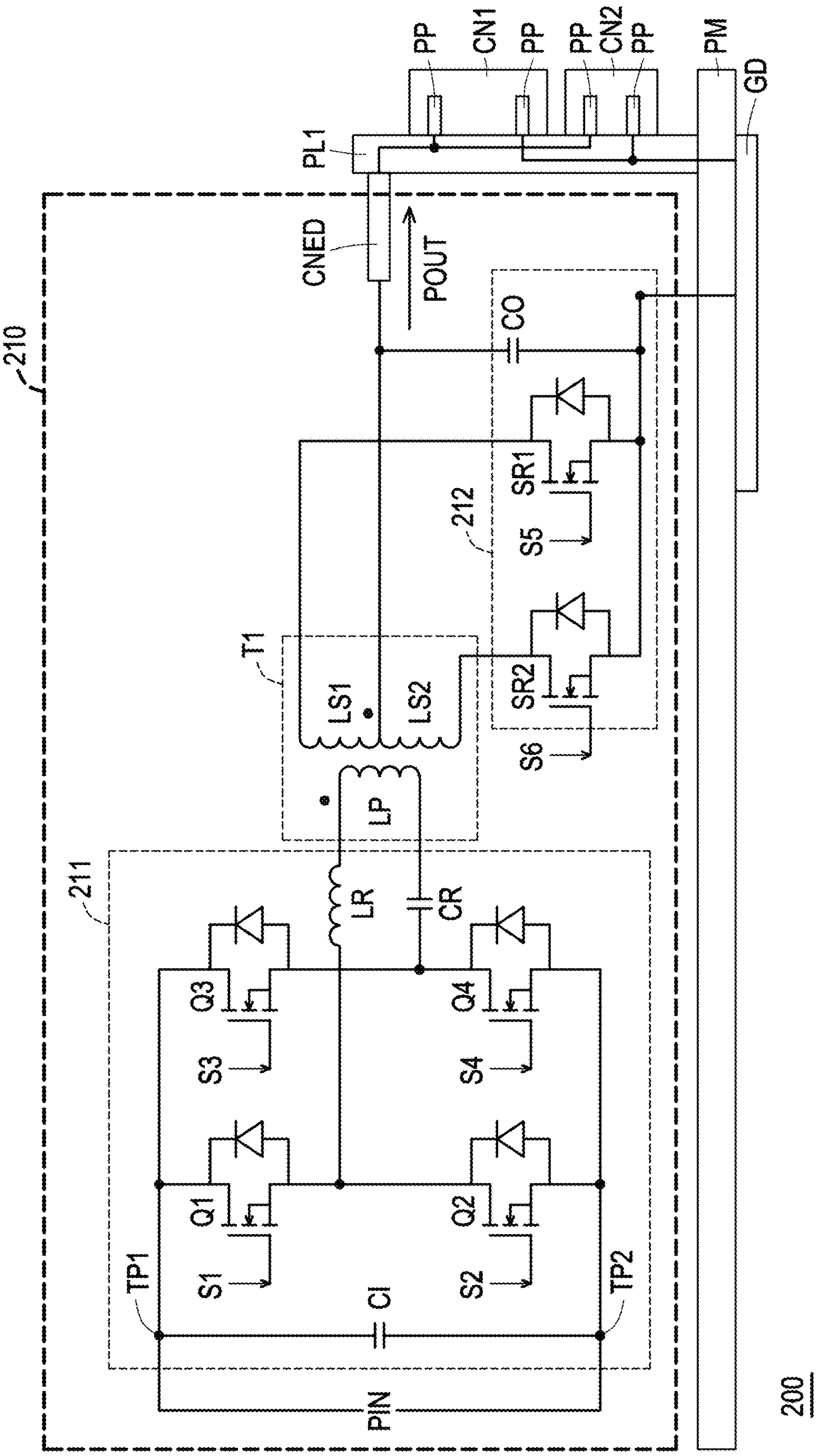
FIG. 2 is a schematic diagram of a power supply device according to a second embodiment of the disclosure.

With reference to FIG. 2, FIG. 2 is a schematic diagram of a power supply device according to a second embodiment of the disclosure. In this embodiment, a power supply device 200 includes the main circuit board PM, the power output panel PL, and a power supply unit 210.

The power output panel PL and the power supply unit 210 are arranged on the main circuit board PM. The power supply unit 210 includes the transformer T1, a primary circuit 211, rectifier elements SR1 and SR2, an output capacitor CO, and the output connection electrode CNED. The transformer T1 includes a primary winding LP and secondary windings LS1 and LS2. In this embodiment, the rectifier elements SR1 and SR2 and the output capacitor CO may together form a secondary circuit 212 of the power supply unit 210.

The primary circuit 211 includes an input capacitor CI, power switches Q1 to Q4, a resonant inductor LR, and a resonant capacitor CR. The input capacitor CI is electrically connected between input terminals TP1 and TP2 of the primary circuit 211. A first terminal of the power switch Q1 is electrically connected to the input terminal TP1. A control terminal of the power switch Q1 receives a switching signal S1. A first terminal of the power switch Q2 is electrically connected to a second terminal of the power switch Q1. A second terminal of the power switch Q2 is electrically connected to the input terminal TP2. A control terminal of the power switch Q2 receives a switching signal S2. A first terminal of the power switch Q3 is electrically connected to the input terminal TP1. A control terminal of the power switch Q3 receives a switching signal S3. A first terminal of the power switch Q4 is electrically connected to a second terminal of the power switch Q3. A second terminal of the power switch Q4 is electrically connected to the input terminal TP2. A control terminal of the power switch Q4 receives a switching signal S4.

In this embodiment, the primary winding LP, the resonant inductor LR, and the resonant capacitor CR together form a resonant tank. The resonant tank is electrically connected between the second terminal of the power switch Q1 and the second terminal of the power switch Q3. Taking this embodiment as an example, the resonant inductor LR is electrically connected between the second terminal of the power switch Q1 and a first terminal of the primary winding LP. The resonant capacitor CR is electrically connected between the second terminal of the power switch Q3 and a second terminal of the primary winding LP. The serial connection sequence of the primary winding LP, the resonant inductor LR, and the resonant capacitor CR of the disclosure is not limited to this embodiment.

In this embodiment, a first terminal of the secondary winding LS1 is electrically connected to a first terminal of the output connection electrode CNED. The first terminal of the secondary winding LS1 is treated as a power output terminal. A second terminal of the output connection electrode CNED is electrically connected to a power pin PP of the connector CN1 and a power pin PP of the connector CN2. For instance, the second terminal of the output connection electrode CNED may be electrically connected to the power pin PP of the connector CN1 and the power pin PP of the connector CN2 through an internal connection structure or a surface conductive structure of the power output panel PL. A second terminal of the secondary winding LS1 is electrically connected to the secondary circuit 212. A first terminal of the secondary winding LS2 is electrically connected to the first terminal of the output connection electrode CNED. A second terminal of the secondary winding LS2 is electrically connected to the secondary circuit 212. The second terminal of the secondary winding LS1 is connected to a ground pin PG of the connector CN1 and a ground pin PG of the connector CN2 through the rectifier element SR1 and a ground electrode GD of the main circuit board PM. The second terminal of the secondary winding LS2 is connected to the ground pin PG of the connector CN1 and the ground pin PG of the connector CN2 through the rectifier element SR2 and the ground electrode GD of the main circuit board PM. For instance, the second terminal of the secondary winding LS1 and the second terminal of the secondary winding LS2 may be further electrically connected to the ground pin PG of the connector CN1 and the ground pin PG of the connector CN2 respectively through the internal connection structure or the surface conductive structure of the power output panel PL.

In this embodiment, the power output panel PL and the power supply unit 210 are disposed on a same side of the main circuit board PM. The ground electrode GD of the main circuit board PM is arranged on the other side of the main circuit board PM. The main circuit board PM may electrically connect the ground pins PG, the second terminal of the secondary winding LS1, and the second terminal of the secondary winding LS2 to the ground electrode GD using a through-hole conductive structure (not shown).

In this embodiment, the rectifier elements SR1 and SR2 may be synchronous rectifier switches. A first terminal of the rectifier element SR1 is electrically connected to the second terminal of the secondary winding LS1. A second terminal of the rectifier element SR1 is electrically connected to the ground electrode GD. A control terminal of the rectifier element SR1 receives a rectifying signal S5. A first terminal of the rectifier element SR2 is electrically connected to the second terminal of the secondary winding LS2. A second terminal of the rectifier element SR2 is electrically connected to the ground electrode GD. A control terminal of the rectifier element SR2 receives a rectifying signal S6. The output capacitor CO is electrically connected between the output connection electrode CNED and the ground electrode GD.

In some embodiments, the rectifier elements SR1 and SR2 may be rectifier diodes.

In this embodiment, the power supply unit 210 receives an input power source PIN. The power supply unit 210 utilizes the primary circuit 211 and the transformer T1 to convert the input power source PIN into a conversion power source. The conversion power source is located at the first terminal of the secondary winding LS1. Further, the power supply unit 210 utilizes the rectifier elements SR1 and SR2 and the output capacitor CO to rectify the conversion power source, and an output power source POUT is thereby generated. The power supply unit 210 transmits the output power source POUT to the power output panel PL using the output connection electrode CNED.

In this embodiment, the power supply unit 210 is implemented by, for example, an LLC power supply. In some embodiments, the power supply unit 210 may be implemented by a power conversion circuit having a transformer well known to a person having ordinary skill in the art. In the disclosure, the number of the secondary windings of the power supply unit 210 may be one or more, and the disclosure is not limited to the number of the secondary windings.

In some embodiments, the primary circuit 211 may be arranged in a circuit of the power supply unit 210. For instance, the primary circuit 211 is a circuit provided on the main circuit board PM.

Figure 3:
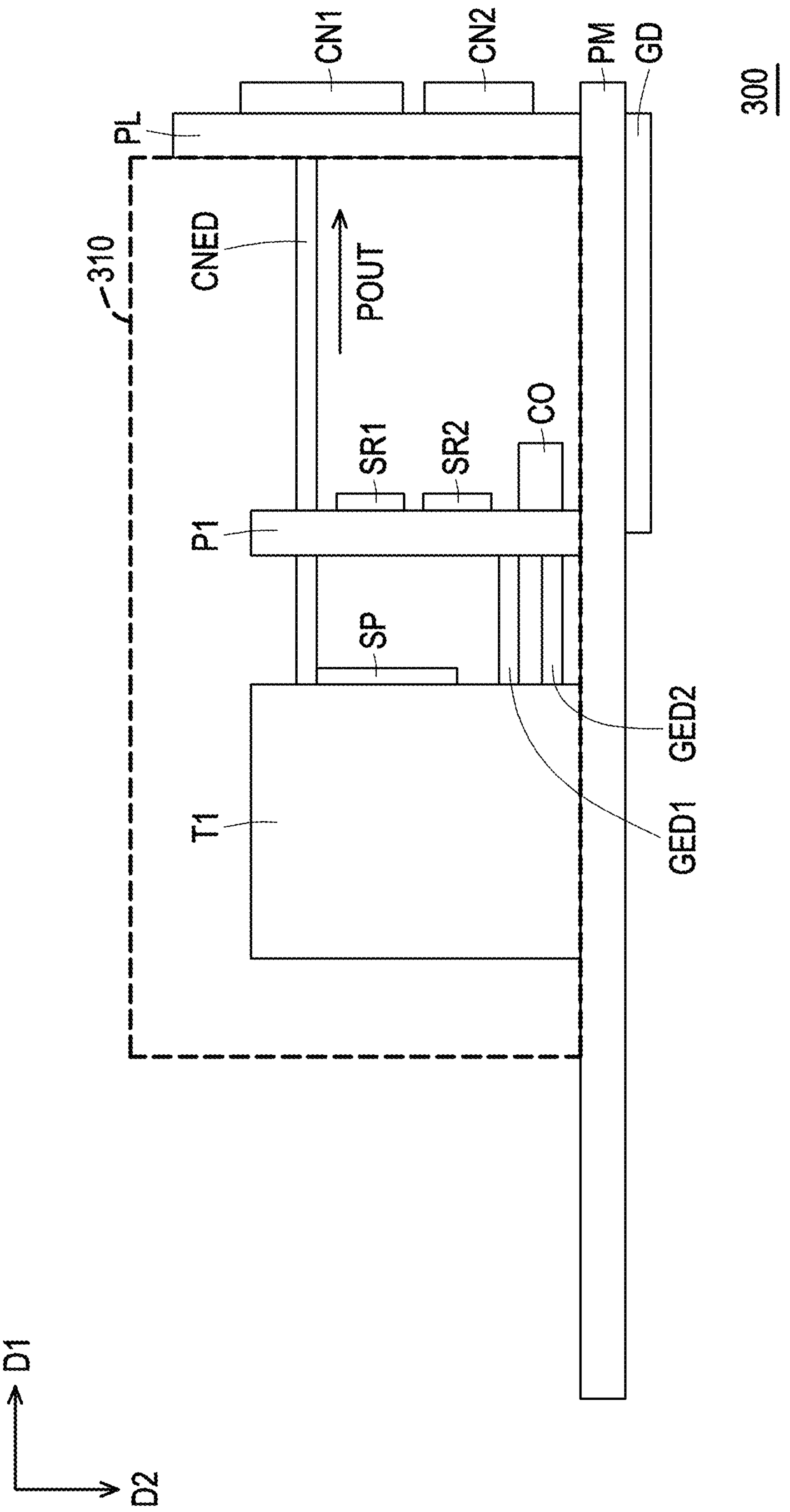
FIG. 3 is a schematic diagram of a power supply device according to a third embodiment of the disclosure.

With reference to FIG. 2 and FIG. 3 together, FIG. 3 is a schematic diagram of a power supply device according to a third embodiment of the disclosure. In this embodiment, a power supply device 300 includes the main circuit board PM, the power output panel PL, and a power supply unit 310. The power output panel PL and the power supply unit 310 are arranged on the main circuit board PM. The power supply unit 310 includes the transformer T1, the rectifier elements SR1 and SR2, the output capacitor CO, and the output connection electrode CNED. In this embodiment, the electrical connection relationship among the transformer T1, the circuit board P1, the rectifier elements SR1 and SR2, the output capacitor CO, the output connection electrode CNED, and the power output panel PL is clearly explained in the embodiments of FIG. 2, so description thereof is not repeated herein.

In this embodiment, the power output panel PL is vertically disposed on the main circuit board PM. The output connection electrode CNED extends in the direction D1 to the power output panel PL.

In this embodiment, the transformer T1 and the circuit board P1 are disposed on the main circuit board PM. The rectifier elements SR1 and SR2 and the output capacitor CO are arranged on the circuit board P1. Therefore, the output connection electrode CNED penetrates the circuit board P1 and is electrically connected between the transformer T1 and the power output panel PL. The first terminal of the rectifier element SR1 and the first terminal of the rectifier element SR2 are electrically connected to the first terminals of the secondary windings LS1 and LS2 of the transformer T1 and the power output panel PL through the output connection electrode CNED and a first connection structure (e.g., a printed circuit, the disclosure is not limited thereto) on the circuit board P1. The rectifier element SR1 is electrically connected to the second terminal of the secondary winding LS1 of the transformer T1, the ground electrode GD of the main circuit board PM, and the power output panel PL through a second connection structure on the circuit board P1. The rectifier element SR2 is electrically connected to the second terminal of the secondary winding LS2 of the transformer T1, the ground electrode GD of the main circuit board PM, and the power output panel PL through a third connection structure on the circuit board P1.

Taking this embodiment as an example, the rectifier element SR1 is electrically connected to the second terminal of the secondary winding LS1 of the transformer T1 through an electrode GED1. The rectifier element SR2 is electrically connected to the second terminal of the secondary winding LS2 of the transformer T1 through an electrode GED2.

In this embodiment, the output connection electrode CNED includes a support portion SP. The support portion SP is fixed onto a housing of the transformer T1. The support portion SP extends in a direction D2. It should be noted that the output connection electrode CNED has weight. The output connection electrode CNED may be deformed (e.g., sag) due to its weight, causing an abnormal connection between the output connection electrode CNED and the transformer T1. In this embodiment, the support portion SP fixed onto the housing of the transformer T1 can support the weight of the output connection electrode CNED. The output connection electrode CNED may not be deformed due to its own weight.

Figure 4:
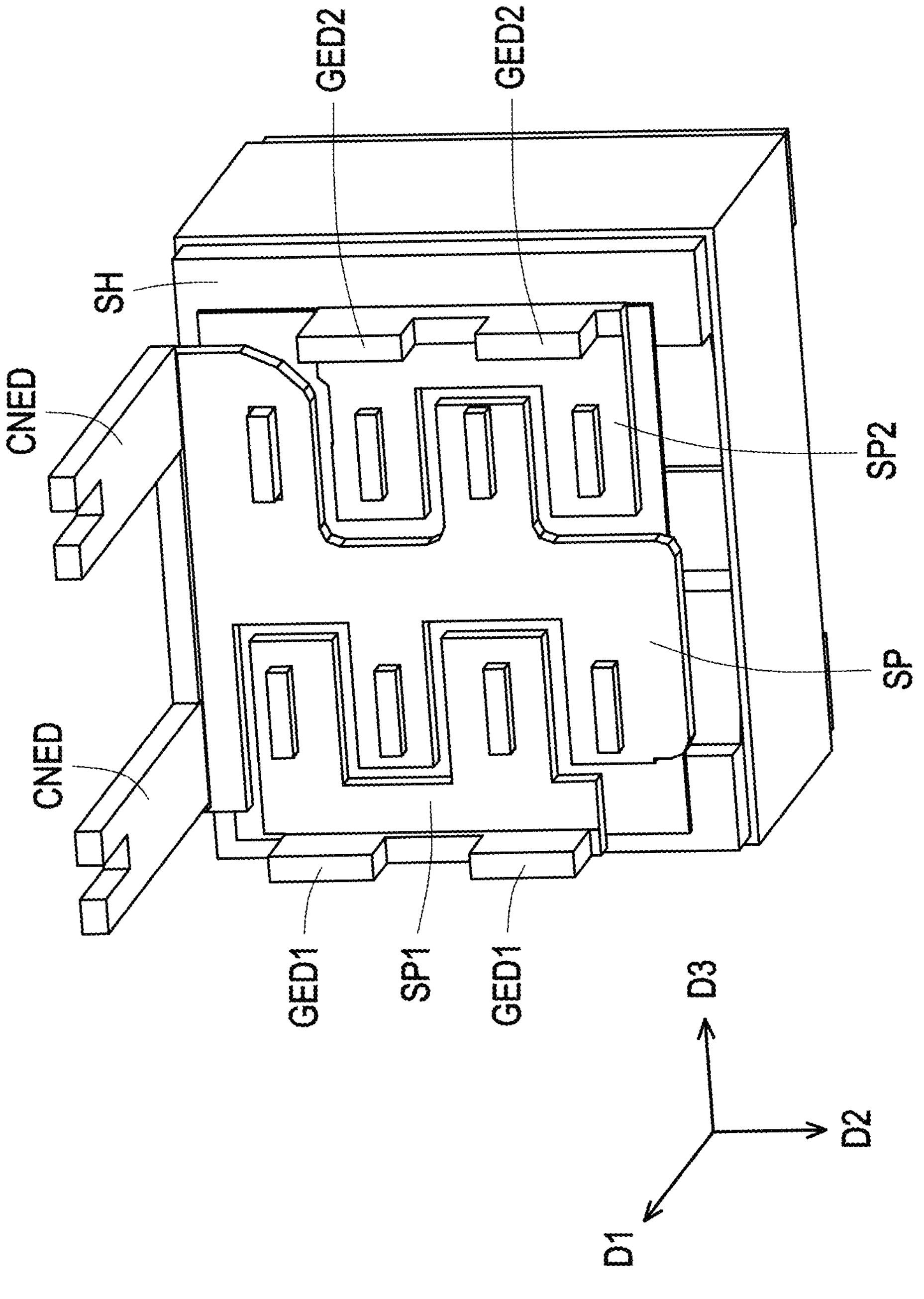
FIG. 4 is a schematic view of a transformer and an output connection electrode according to an embodiment of the disclosure.

With reference to FIG. 3 and FIG. 4 together, FIG. 4 is a schematic view of a transformer and an output connection electrode according to an embodiment of the disclosure. In this embodiment, the support portion SP of the output connection electrode CNED is fixed onto a housing SH of the transformer T1. Further, in order to increase a support area of the support portion SP, the support portion SP extends on the housing SH in other directions (e.g., direction D3) besides the directions D1 and D2.

Besides, the electrode GED1 includes a support portion SP1. The electrode GED2 includes a support portion SP2. The support portions SP1 and SP2 are fixed onto the housing SH of the transformer T1 as well. To increase support areas of the support portions SP1 and SP2, the support portion SP1 and the support portion SP2 may be interdigitated structures. The support portion SP2 and the support portion SP3 may be interdigitated structures.

Figure 5:
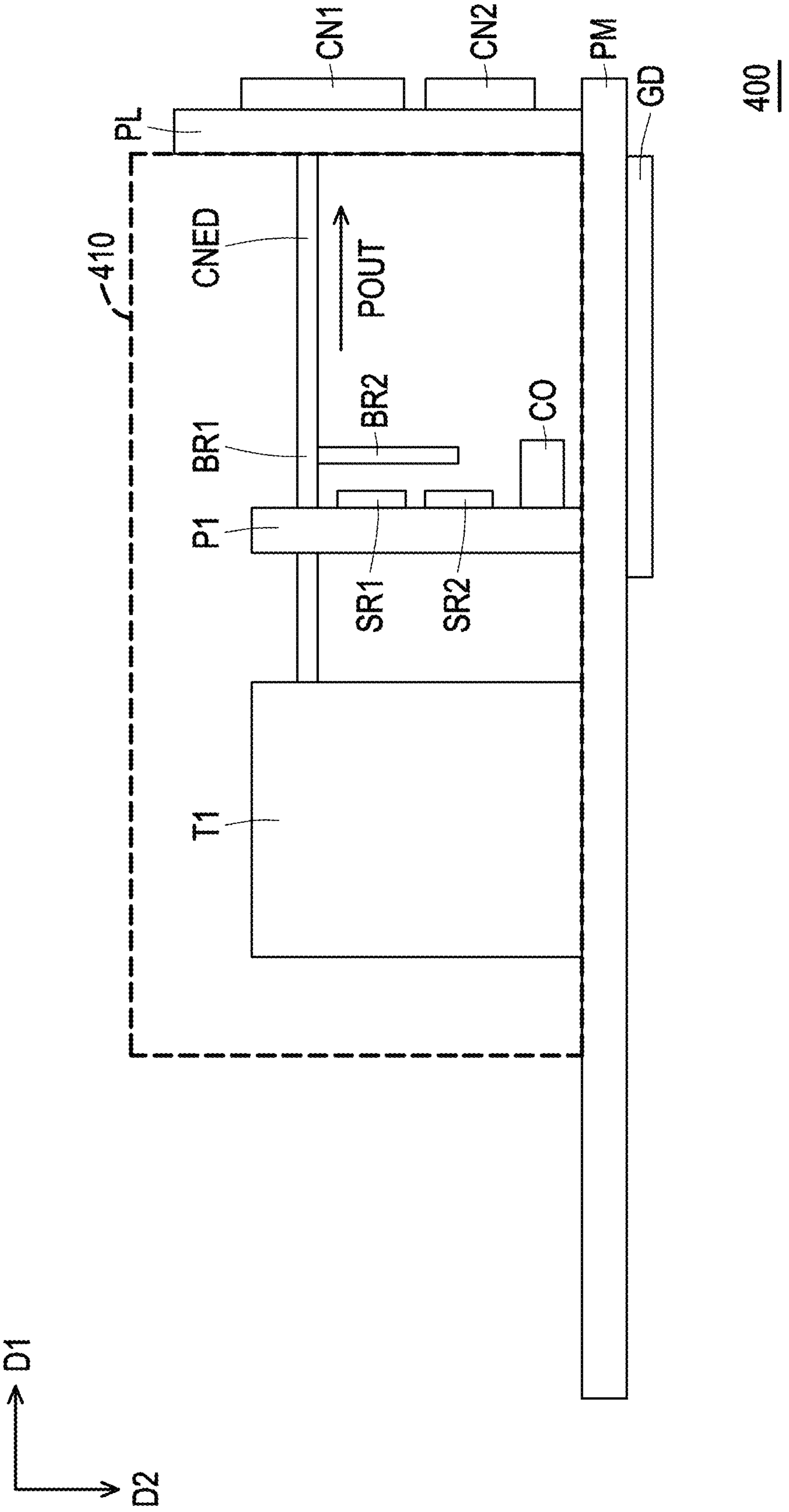
FIG. 5 is a schematic diagram of a power supply device according to a fourth embodiment of the disclosure.

With reference to FIG. 2 and FIG. 5 together, FIG. 5 is a schematic diagram of a power supply device according to a fourth embodiment of the disclosure. In this embodiment, a power supply device 400 includes the main circuit board PM, the power output panel PL, and a power supply unit 410. The power output panel PL and the power supply unit 410 are arranged on the main circuit board PM. The power supply unit 410 includes the transformer T1, the circuit board P1, the rectifier elements SR1 and SR2, the output capacitor CO, and the output connection electrode CNED. In this embodiment, the electrical connection relationship among the transformer T1, the rectifier elements SR1 and SR2, the output capacitor CO, the output connection electrode CNED, and the power output panel PL is clearly explained in the embodiments of FIG. 2, so description thereof is not repeated herein.

In this embodiment, the output connection electrode CNED includes branch structures BR1 and BR2. The branch structure BR1 extends in the direction D1. The branch structure BR1 is electrically connected between the transformer T1 and the power output panel PL. The branch structure BR2 extends from the branch structure BR1 in the direction D2. The branch structure BR2 covers at least a portion of the rectifier elements SR1 and SR2. To be specific, the branch structure BR2 has a projection range on the circuit board P1. The projection range at least partially overlaps with a layout of the rectifier elements SR1 and SR2.

In this embodiment, the branch structure BR2 is used to dissipate heat from the rectifier elements SR1 and SR2. Further, the branch structures BR1 and BR2 are conductive structures made of a same or similar materials. The branch structures BR1 and BR2 also exhibit improved heat conduction effects. Once the branch structure BR1 is cooled, the temperature of the branch structure BR2 may also be lowered to dissipate heat from the rectifier elements SR1 and SR2. In this embodiment, the branch structure BR2 may also dissipate heat from the circuit board P1.

In some embodiments, the branch structure BR2 may also cover the output capacitor CO to dissipate heat from the output capacitor CO.

Figure 6:
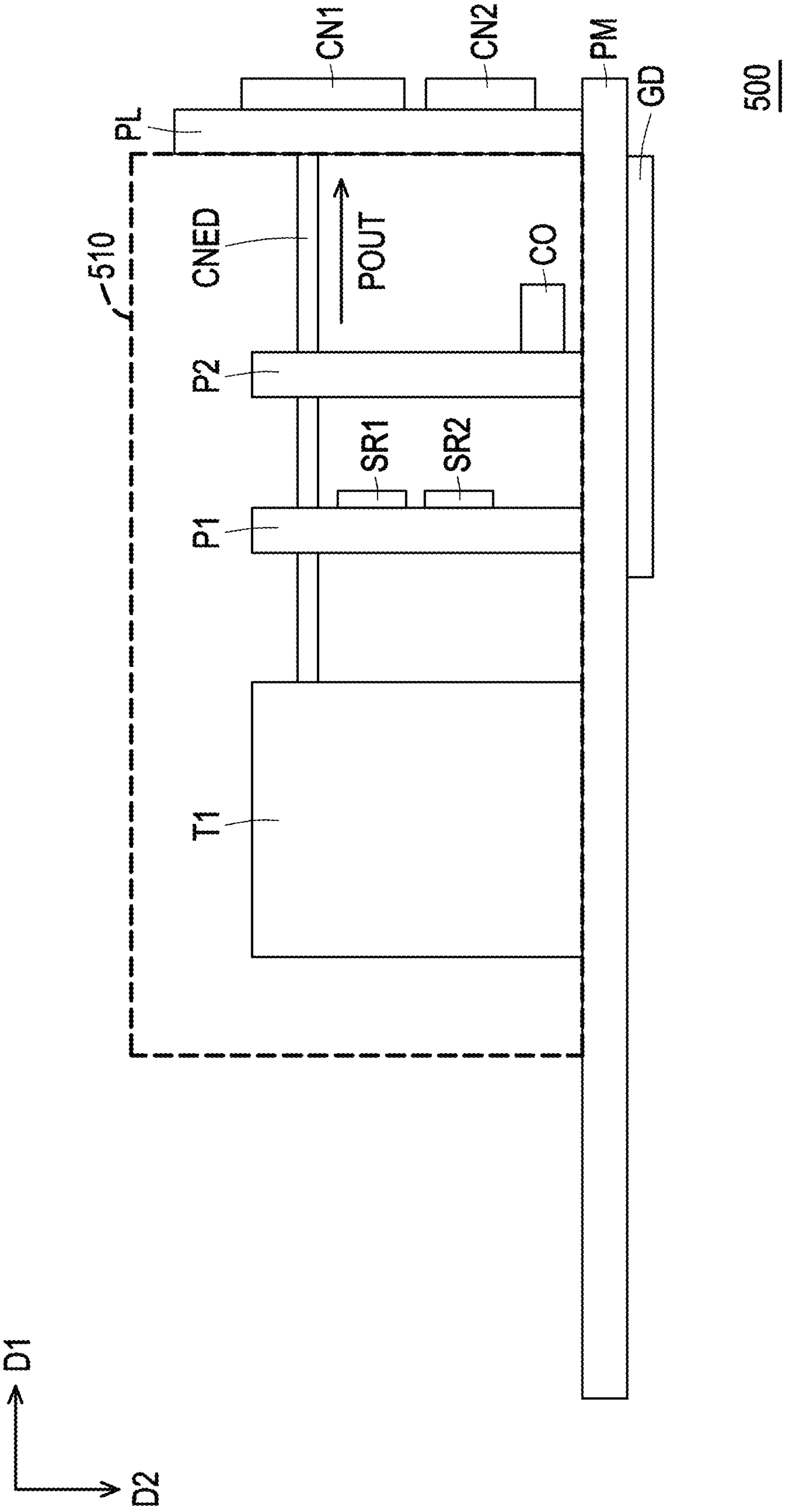
FIG. 6 is a schematic diagram of a power supply device according to a fifth embodiment of the disclosure.

With reference to FIG. 2 and FIG. 6 together, FIG. 6 is a schematic diagram of a power supply device according to a fifth embodiment of the disclosure. In this embodiment, a power supply device 500 includes the main circuit board PM, the power output panel PL, and a power supply unit 510. The power output panel PL and the power supply unit 510 are arranged on the main circuit board PM. The power supply unit 510 includes the transformer T1, circuit boards P1 and P2, the rectifier elements SR1 and SR2, the output capacitor CO, and the output connection electrode CNED. In this embodiment, the electrical connection relationship among the transformer T1, the rectifier elements SR1 and SR2, the output capacitor CO, the output connection electrode CNED, and the power output panel PL is clearly explained in the embodiments of FIG. 2, so description thereof is not repeated herein.

In this embodiment, the transformer T1 and the circuit boards P1 and P2 are disposed on the main circuit board PM. The rectifier elements SR1 and SR2 are disposed on the circuit board P1. The output capacitor CO is arranged on the circuit board P2. The output connection electrode CNED penetrates the circuit boards P1 and P2 and is electrically connected between the transformer T1 and the power output panel PL. In this embodiment, the rectifier elements and the output capacitor are placed separately on different circuit boards according to their functionality, and modularization facilitates design and manufacturing, reduces costs, and makes repairs easier.

Figure 7:
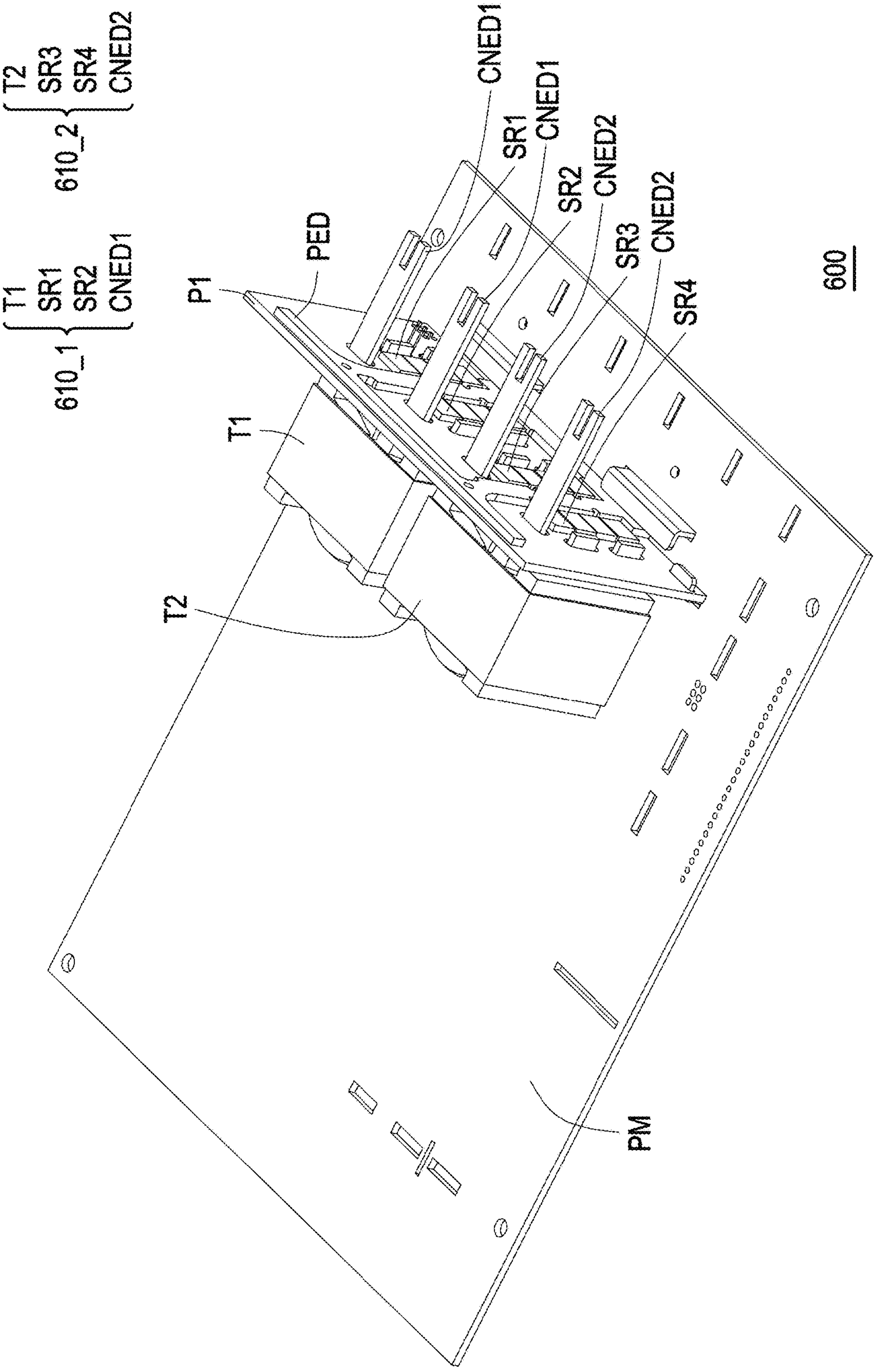
FIG. 7 is a schematic view of a circuit board of a power supply device according to a sixth embodiment of the disclosure.
Figure 8:
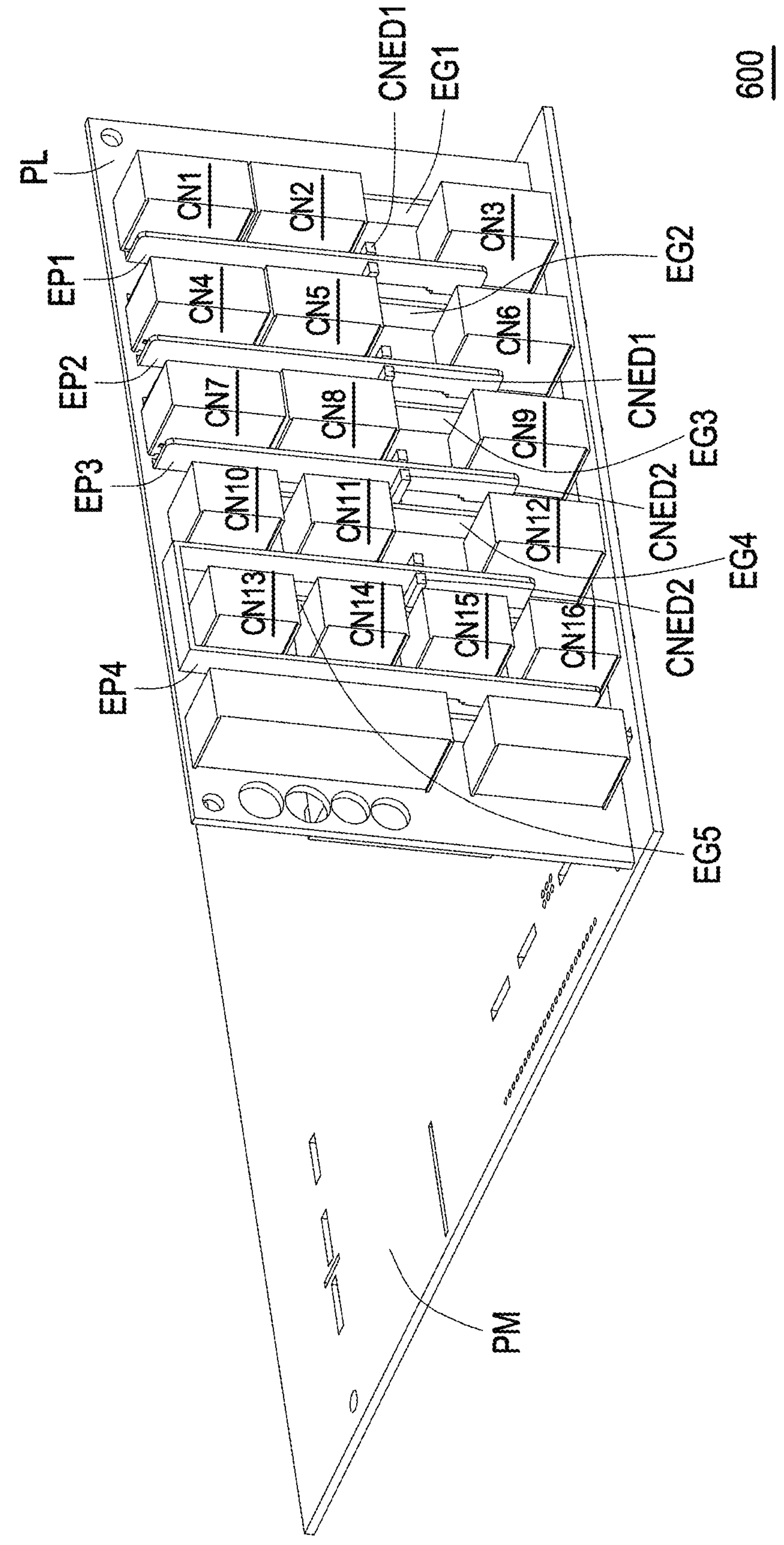
FIG. 8 is a schematic view of the power supply device according to the sixth embodiment of the disclosure.

With reference to FIG. 7 and FIG. 8 together, FIG. 7 is a schematic view of a circuit board of a power supply device according to a sixth embodiment of the disclosure. FIG. 8 is a schematic view of the power supply device according to the sixth embodiment of the disclosure. In this embodiment, a power supply device 600 includes the main circuit board PM, the power output panel PL, the circuit board P1, and power supply units 610_1 and 610_2. The power output panel PL and the power supply units 610_1 and 610_2 are arranged on the main circuit board PM. The power supply unit 610_1 at least includes the transformer T1, the rectifier elements SR1 and SR2, and an output connection electrode CNED1. The power supply unit 610_2 at least includes a transformer T2, rectifier elements SR3 and SR4, and an output connection electrode CNED2. The electrical connection of the transformer T1, the rectifier elements SR1 and SR2, and the output connection electrode CNED1 is similar to the electrical connection of the transformer T1, the rectifier elements SR1 and SR2, and the output connection electrode CNED1 shown in FIG. 2. The electrical connection of the transformer T2, the rectifier elements SR3 and SR4, and the output connection electrode CNED2 is similar to the electrical connection of the transformer T1, the rectifier elements SR1 and SR2, and the output connection electrode CNED shown in FIG. 2.

In this embodiment, the rectifier elements SR1 to SR4 are arranged on the circuit board P1. In this embodiment, the circuit board P1 has an electrode pattern PED. The electrode pattern PED is connected to the ground electrode (e.g., the ground electrode GD in FIG. 2) of the main circuit board PM.

In this embodiment, the power output panel PL includes electrode structures EG1 to EG5 and EP1 to EP4 as well as connectors CN1 to CN16. The electrode structures EG1 to EG5 are electrically connected to the ground electrode of the main circuit board PM. The electrode structures EP1 and EP2 are electrically connected to the output connection electrode CNED1. The electrode structures EP3 and EP4 are electrically connected to the output connection electrode CNED2.

Power pins of the connectors CN1 to CN3 are electrically connected to the output connection electrode CNED1 through the electrode structure EP1. Power pins of the connectors CN4 to CN6 are electrically connected to the output connection electrode CNED1 through the electrode structure EP2. Power pins of the connectors CN7 to CN9 are electrically connected to the output connection electrode CNED2 through the electrode structure EP3. Power pins of the connectors CN10 to CN16 are electrically connected to the output connection electrode CNED2 through the electrode structure EP4.

Ground pins of the connectors CN1 to CN3 are electrically connected to the ground electrode of the main circuit board PM through the electrode structure EG1. Ground pins of the connectors CN4 to CN6 are electrically connected to the ground electrode of the main circuit board PM through the electrode structure EG2. Ground pins of the connectors CN7 to CN9 are electrically connected to the ground electrode of the main circuit board PM through the electrode structure EG3. Ground pins of the connectors CN10 to CN12 are electrically connected to the ground electrode of the main circuit board PM through the electrode structure EG4. Ground pins of the connectors CN13 to CN16 are electrically connected to the ground electrode of the main circuit board PM through the electrode structure EG5.

Figure 9:
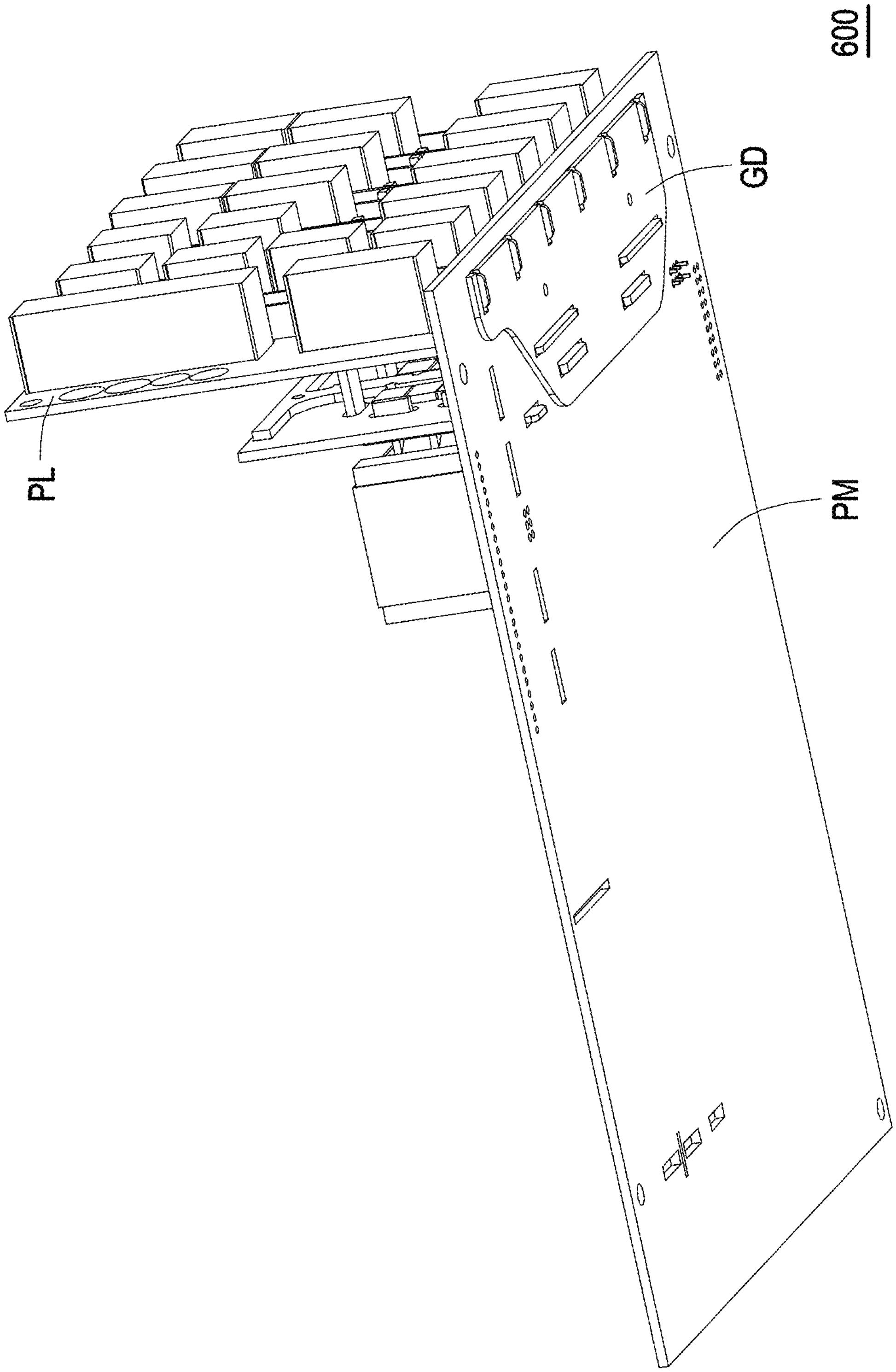
FIG. 9 is a schematic view of a ground electrode of a main circuit board according to an embodiment of the disclosure.

With reference to FIG. 8 and FIG. 9 together, FIG. 9 is a schematic view of a ground electrode of a main circuit board according to an embodiment of the disclosure. FIG. 9 illustrates the ground electrode GD of the main circuit board PM. In this embodiment, the rectifier elements SR1 to SR4 and the output connection electrodes CNED1 and CNED2 are not arranged on the main circuit board PM. The circuit layout of the main circuit board PM may be simplified. Therefore, the ground electrode GD of the main circuit board PM may have a larger area. As such, the ground impedance of the power supply device 600 may be reduced.

In view of the foregoing, the output connection electrode transmits the output power source to at least one connector of the power output panel. The output power source is transmitted to the power output panel through the output connection electrode. The power output path of the output power source does not pass through the main circuit board. In this way, the output impedance of the power supply device may be reduced. The efficiency of the power supply device may be improved. Further, the rectifier elements and the output connection electrode of the power supply unit are not arranged on the main circuit board. The circuit layout of the main circuit board may be simplified. Therefore, the ground electrode of the main circuit board may have a larger area. As such, the ground impedance of the power supply device may be reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power supply device, comprising:

a main circuit board;

a power output panel arranged on a first side of the main circuit board; and a power supply unit arranged on the first side of the main circuit board and configured to provide an output power source, wherein the power supply unit comprises:

an output connection electrode electrically connected to the power output panel and configured to transmit the output power source from the power supply unit to at least one connector of the power output panel;

a transformer comprising a secondary winding, wherein a first terminal of the secondary winding is electrically connected to a first terminal of the output connection electrode; and a rectifier element, wherein a second terminal of the secondary winding is connected to a ground pin of the at least one connector through the rectifier element and a ground electrode of the main circuit board, wherein the ground electrode is arranged on a second side of the main circuit board, wherein the second side is opposite to the first side.

2. The power supply device according to claim 1, wherein a second terminal of the output connection electrode is electrically connected to a power pin of the at least one connector.

3. The power supply device according to claim 2, wherein the power supply unit further comprises:

an output capacitor electrically connected between the output connection electrode and the ground electrode of the main circuit board.

4. The power supply device according to claim 3, wherein the power supply unit further comprises a first circuit board, the first circuit board is arranged on the main circuit board, and the rectifier element and the output capacitor are arranged on the first circuit board.

5. The power supply device according to claim 3, wherein the power supply unit further comprises a first circuit board and a second circuit board, the first circuit board and the second circuit board are arranged on the main circuit board, the rectifier element is arranged on the first circuit board, and the output capacitor is arranged on the second circuit board.

6. The power supply device according to claim 3, wherein the output connection electrode comprises:

a first branch structure extending in a first direction and electrically connected between the transformer and the power output panel; and a second branch structure extending from the first branch structure in a second direction and covering a portion of the rectifier element.

7. The power supply device according to claim 2, wherein the output connection electrode comprises:

a support portion fixed onto a housing of the transformer.

8. The power supply device according to claim 1, wherein the power output panel is vertically disposed on the main circuit board, and the output connection electrode extends to the power output panel in a first direction.

9. A power supply unit arranged on a first side of a main circuit board and configured to provide an output power source to a power output panel arranged on the first side of the main circuit board, the power supply unit comprising:

a transformer comprising a secondary winding;

an output connection electrode electrically connected between the transformer and the power output panel and configured to transmit the output power source to at least one connector of the power output panel, wherein a first terminal of the secondary winding is electrically connected to a first terminal of the output connection electrode; and a rectifier element, wherein a second terminal of the secondary winding is connected to a ground pin of the at least one connector through the rectifier element and a ground electrode of a main circuit board, wherein the ground electrode is arranged on a second side of the main circuit board, wherein the second side is opposite to the first side.

10. The power supply unit according to claim 9, wherein a second terminal of the output connection electrode is electrically connected to a power pin of the at least one connector.

11. The power supply unit according to claim 10, further comprising:

an output capacitor electrically connected between the output connection electrode and the ground electrode of the main circuit board.

12. The power supply unit according to claim 11, wherein the power supply unit further comprises a first circuit board, and the rectifier element and the output capacitor are arranged on the first circuit board.

13. The power supply unit according to claim 11, wherein the power supply unit further comprises a first circuit board and a second circuit board, the rectifier element is arranged on the first circuit board, and the output capacitor is arranged on the second circuit board.

14. The power supply unit according to claim 11, wherein the output connection electrode comprises:

a first branch structure extending in a first direction and electrically connected between the transformer and the power output panel; and a second branch structure extending from the first branch structure in a second direction and covering a portion of the rectifier element.

15. The power supply unit according to claim 9, wherein the output connection electrode comprises:

a support portion fixed onto a housing of the transformer.

16. The power supply unit according to claim 9, wherein the output connection electrode extends to the power output panel in a first direction.

* * * * *